United States Patent
Allen et al.

(10) Patent No.: US 10,417,285 B2
(45) Date of Patent: *Sep. 17, 2019

(54) CORPUS GENERATION BASED UPON DOCUMENT ATTRIBUTES

(71) Applicant: International Business Machines Corporation, Armonk, NY (US)

(72) Inventors: Corville O. Allen, Morrisville, NC (US); Paul R. Bastide, Boxford, MA (US); Matthew E. Broomhall, Goffstwon, NH (US); Robert E. Loredo, North Miami Beach, FL (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 922 days.

This patent is subject to a terminal disclaimer.

(21) Appl. No.: 14/825,265

(22) Filed: Aug. 13, 2015

(65) Prior Publication Data

US 2015/0347406 A1    Dec. 3, 2015

Related U.S. Application Data

(63) Continuation of application No. 14/292,857, filed on May 31, 2014, now Pat. No. 9,535,910.

(51) Int. Cl.
*G06F 16/93* (2019.01)
*G06F 16/35* (2019.01)
(Continued)

(52) U.S. Cl.
CPC ............ *G06F 16/93* (2019.01); *G06F 16/245* (2019.01); *G06F 16/285* (2019.01); *G06F 16/35* (2019.01); *G06F 16/951* (2019.01); *G06N 5/022* (2013.01)

(58) Field of Classification Search
CPC . G06Q 10/06; G06F 21/604; G06F 17/30864; G06F 17/30616; G06F 16/93; G06N 5/02
See application file for complete search history.

(56) References Cited

U.S. PATENT DOCUMENTS 5,999,664 A    12/1999  Mahoney et al.
6,263,121 B1    7/2001  Melen et al.
(Continued)

FOREIGN PATENT DOCUMENTS

EP          1748365        1/2007
WO        2007076174       7/2007

OTHER PUBLICATIONS

"ODFDOM—The Opendocument API," Apache ODF Toolkit (incubating), The Apache Software Foundation, 2011, 2 pages.

(Continued)

*Primary Examiner* — Etienne P Leroux
(74) *Attorney, Agent, or Firm* — VanLeeuwen & VanLeeuwen; William J. Stock

(57) ABSTRACT

The present disclosure provides an approach in which a domain corpus subset generator correlates documents from a document corpus to domain discernible attributes associated with domain corpus subsets. The domain corpus subset generator analyzes correlation results from the correlation and stores the documents into domain corpus subsets accordingly. In turn, a question-answer system utilizes documents included in a specific domain corpus subset to provide relevant and accurate answers to an input question.

7 Claims, 10 Drawing Sheets

(51) Int. Cl.
*G06F 16/28* (2019.01)
*G06F 16/245* (2019.01)
*G06F 16/951* (2019.01)
*G06N 5/02* (2006.01)

(56) References Cited

U.S. PATENT DOCUMENTS

| | | | |
|---|---|---|---|
| 7,725,475 | B1 | 5/2010 | Alspector et al. |
| 8,515,958 | B2 | 8/2013 | Knight |
| 2004/0013302 | A1 | 1/2004 | Ma et al. |
| 2006/0206483 | A1* | 9/2006 | Knepper ........... G06F 17/30616 |
| 2010/0228743 | A1* | 9/2010 | Rappaport ........ G06F 17/30864 |
| | | | 707/750 |
| 2012/0191716 | A1 | 7/2012 | Omoigui |
| 2012/0331003 | A1* | 12/2012 | Chu-Carroll ............. G06N 5/02 |
| | | | 707/771 |
| 2013/0060787 | A1* | 3/2013 | Doshi ................... G06Q 10/06 |
| | | | 707/749 |
| 2014/0181983 | A1* | 6/2014 | Hart ..................... G06F 21/604 |
| | | | 726/26 |

OTHER PUBLICATIONS

Oliver et al., "Apache POI—the Java API for Microsoft Documents," The Apache Software Foundation, Feb. 2014, 2 pages.
"Oracle Outside in Technology," Oracle, 2012, 2 pages.
"Gaining full value from survey text," IBM Software Business Analytics, IBM SPSS Text Analytics for Surveys, International Business Machines Corporation, 2010, 12 pages.
"SPSS Statistics," International Business Machines Corporation, 2010, 2 pages.
"Natural Language Processing," Wikipedia, Mar. 2014, 9 pages.
Allen et al., "Corpus Generation Based Upon Document Attributes," U.S. Appl. No. 14/292,857, filed May 31, 2014, 42 pages.
"List of IBM Patents or Patent Applications Treated as Related," Letter from Leslie A. Van Leeuwen, Aug. 13, 2015, 1 page.

* cited by examiner

230

| Domain Attribute Table | | |
|---|---|---|
| Template | Attributes | Correlation Value |
| X | Header: 10pt Arial, right side page number | .2 |
| | Footer: 10pt Arial, left side "Company" banner | .5 |
| | Symbol: symbol.jpg | 1.5 |
| | Colors: red, green, blue, black | .1 |
| | Citation: [ABC Organization] | 1.4 |
| | Formulaic Layout: Blank Page after Title Page | .2 |
| | Location-Specified Fonts: 12pt Arial in Body | .2 |
| Y | | |
| Z | | |

CORPUS GENERATION BASED UPON DOCUMENT ATTRIBUTES

BACKGROUND

The present disclosure relates to generating domain corpus subsets from a document corpus to enhance the accuracy of a question-answer system.

An overwhelming amount of information is available to individuals through computer networks from various structured and unstructured sources. To assist with user searches, question-answer (QA) systems are in development that analyze an input question and return results indicative of a most probable answer to the input question. QA systems provide automated mechanisms to analyze large sets of content sources (e.g., electronic documents) corresponding to an input question to determine an answer and a confidence level of the answer's relative accuracy.

In an unstructured information system, information sources utilize various information domains and subdomains to respond to user search requests. However, highly skilled developers are required to generate a customized system with completely accurate rules, which the system utilizes to generate a corpus of documents for the search requests. In addition, as with any customized system, the question-answer system becomes fragile, inflexible, and expensive to maintain.

BRIEF SUMMARY

The present disclosure provides an approach in which a domain corpus subset generator correlates documents from a document corpus to domain discernible attributes associated with domain corpus subsets. The domain corpus subset generator analyzes correlation results from the correlation and stores the documents into domain corpus subsets accordingly. In turn, a question-answer system utilizes documents included in a specific domain corpus subset to provide relevant and accurate answers to an input question.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 3 is an exemplary diagram depicting a domain attribute table that includes discernible attributes of a particular domain;

DETAILED DESCRIPTION

Figure 1:
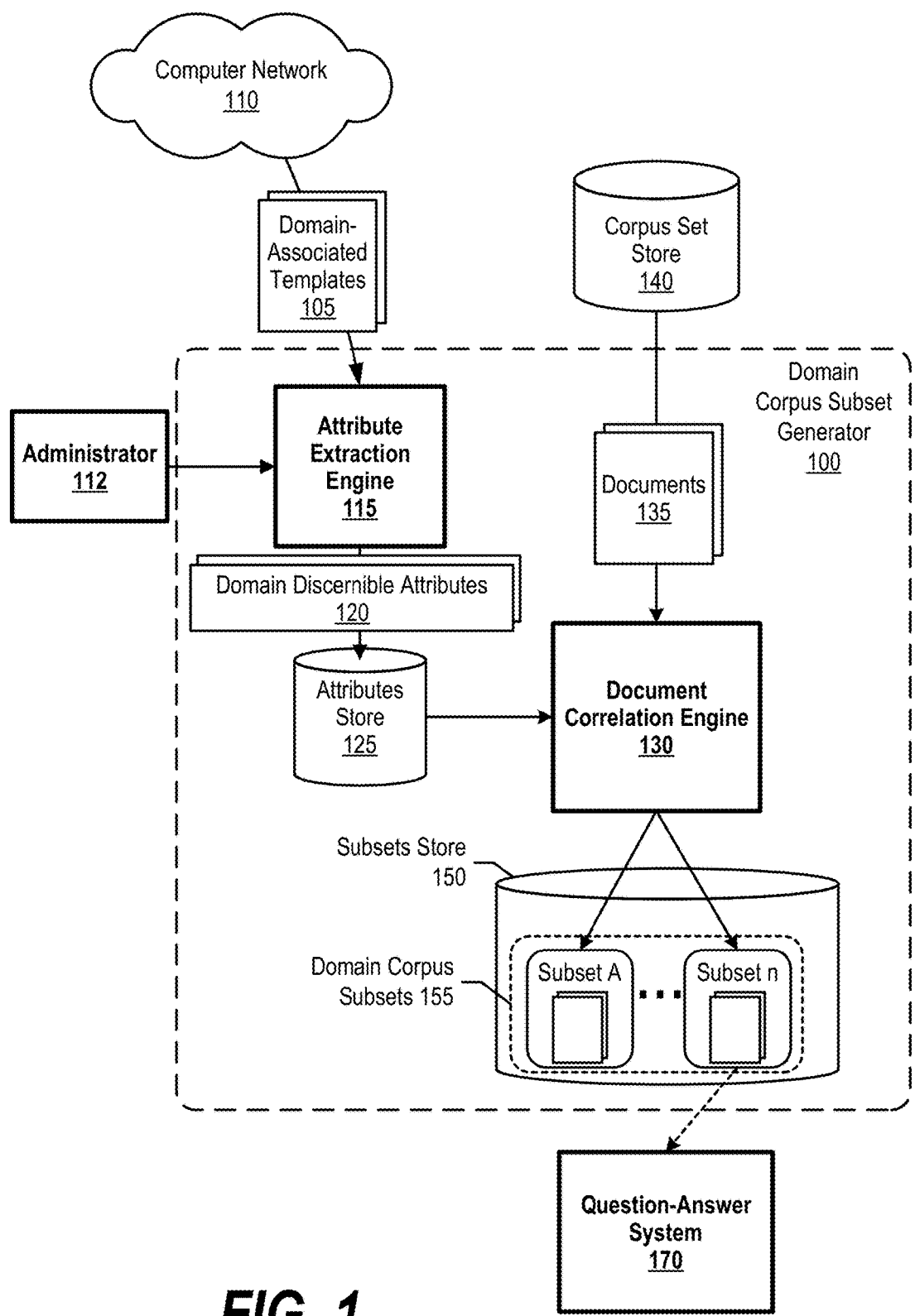
FIG. 1 is an exemplary diagram depicting a domain corpus generator that sorts a document corpus into domain corpus subsets, which enable a question-answer system to provide increased response accuracy to input questions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 is an exemplary diagram depicting a domain corpus generator that sorts a document corpus into domain corpus subsets, which enable a question-answer system to provide increased response accuracy to input questions.

Domain corpus subset generator 100 includes two subsystems, which are attribute extraction engine 115 and document correlation engine 130. Attribute extraction engine 110 gathers domain-associated templates 105 through computer network 110, such as from websites associated with particular domains. For example, the Institute of Electrical and Electronic Engineers (IEEE) organization may be associated with a "technical" domain and have a website that provides templates to authors for the authors to write IEEE articles in an acceptable format. In this example, attribute extraction engine 115 retrieves the templates from the IEEE website.

Attribute extraction engine 110 identifies template attributes in domain-associated templates 105, which may include style attributes and/or content attributes. For example, the style attributes may include symbols, citations, title font type and size, header/footer font type and size, or other attributes that describe the structure, style, or look of the template. The content attributes may include grammatical information such as word types, sentence complexity, or other attributes that describe the content in the template.

Attribute extraction engine 115 associates the attributes to a particular domain (e.g., IEEE template attributes associated to a technical domain), and stores the attributes as domain discernible attributes 120 in attributes store 125. In one embodiment, attribute extraction engine 115 stores domain discernible attributes 120 into a table that is dedicated to a specific domain. In another embodiment, attribute extraction engine 110 assigns an attribute correlation value to each domain discernible attribute that indicates a confidence level of correlation. In this embodiment, the attribute correlation values correspond to the "uniqueness" of the domain discernible attribute, such as a high correlation value for a unique symbol, and a low correlation value for a font size (see FIG. 3 and corresponding text for further details). As those skilled in the art can appreciate, domain corpus subset generator 100 may store the domain discernible attributes in a different data organization mechanism instead of a table, such as a data structure, database, or graph structure.

In one embodiment, attribute extraction engine 115 may define particular domain discernible attributes as "domain-unique attributes" if the attributes are unique only to one domain, such as a specific symbol, watermark, citation, etc. In another embodiment, administrator 112 may provide domain discernible attributes to attribute extraction engine 115. For example, administrator 112 may provide attribute table entries, templates, or previously sorted documents to attributes extraction engine 112.

Document correlation engine 130 retrieves documents 135 from corpus set store 140 and extracts document attributes from each of documents 135. The document attributes may include document style attributes (watermarks, symbols, color types, font sizes, page number locations, etc.), or document content attributes, such as sentence complexity, etc. In turn, document correlation engine 130 correlates the document attributes to domain discernible attributes in attributes store 125. In one embodiment, document correlation engine 130 increments a correlation counter during correlation according to correlation values assigned to matching domain discernable attributes.

When the correlation results in a correlation value that reaches a correlation threshold, document correlation engine 130 stores the document in one of domain corpus subsets 155 in subsets store 150. For example, when document correlation engine 130 correlates a document to domain discernible attributes associated with a "Technical" domain, document correlation engine 130 stores the document in one of domain corpus subsets 155 that correspond to the technical domain (see FIGS. 7, 8, and corresponding text for further details). In one embodiment, document correlation engine 130 may store the document into multiple document corpus subsets when the document correlates to multiple domains, such as a technical domain and a computing domain.

Question-answer (QA) system 170, in turn, loads one of domain corpus subsets 155 that correspond to an input question's domain or context. For example, question-answer system 170 may receive an input question corresponding to a legal matter and load a domain corpus subset corresponding to a "Legal" domain. By utilizing a domain corpus subset that includes documents specific to a particular to domain, question-answer system 170 provides answers to input questions with increased accuracy.

Figure 2:
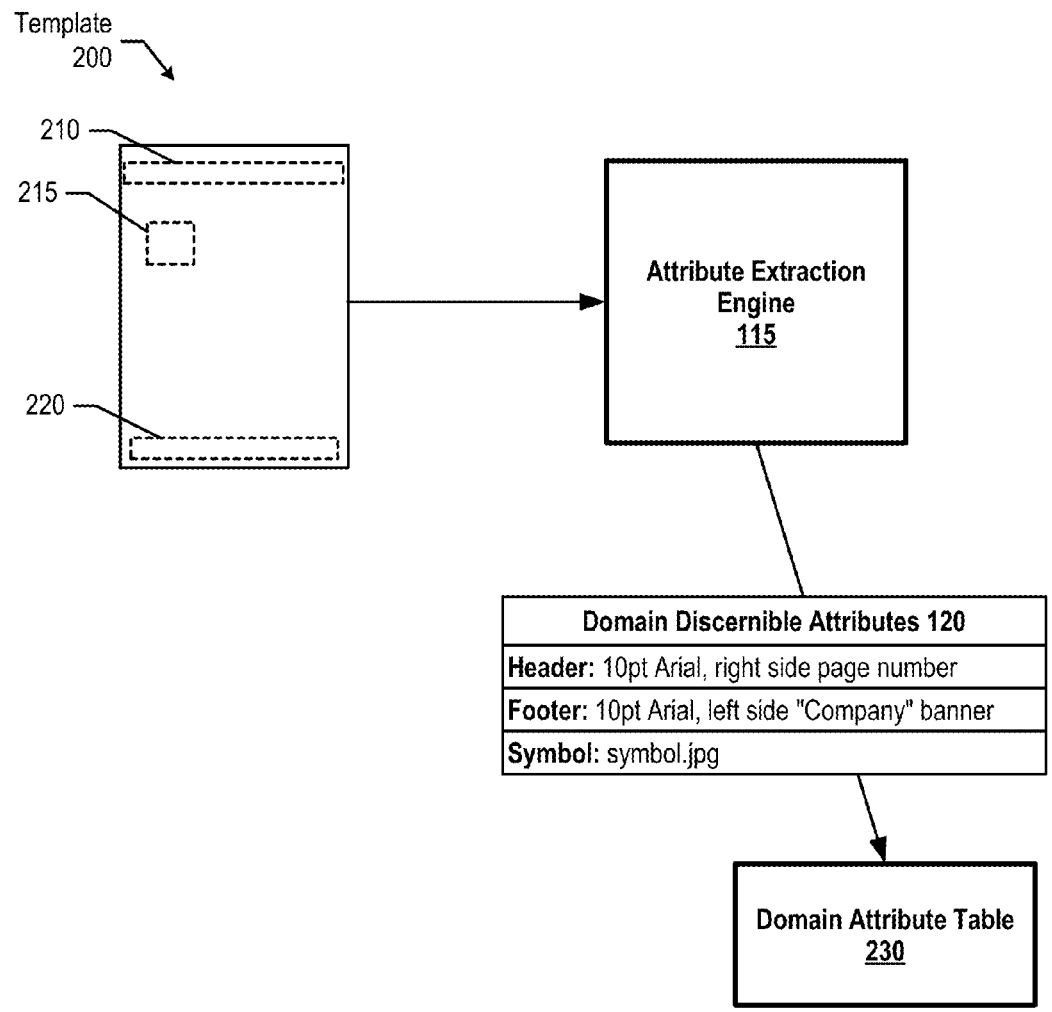
FIG. 2 is an exemplary diagram depicting an attribute extraction engine that identifies attributes of a domain-associated template and stores the attributes in a domain attribute table.

FIG. 2 is an exemplary diagram depicting an attribute extraction engine that identifies attributes of a domain-associated template and stores the attributes in a domain attribute table. Attribute extraction engine 115 parses template 200, which is part of domain-associated templates 105, and identifies template attributes 210, 215, and 330. Attributes 210, 215, and 220 correspond to template 200's header, company symbol, and footer, respectively.

In turn, attribute extraction engine 115 generates domain discernible attributes 120, which include a header attribute, a symbol attribute, and a footer attribute. In one embodiment, attribute extraction engine 115 stores domain discernible attributes 120 in a domain attributes table designated for a particular domain (domain attribute table 230). In another embodiment, attribute extraction engine 115 assigns a correlation value to each attribute based upon the attribute's uniqueness (see FIG. 3 and corresponding text for further details).

FIG. 3 is an exemplary diagram depicting a domain attribute table that includes discernible attributes of a particular domain. Table 230 includes columns 300, 310, and 320. Column 300 includes a list of templates that attribute extraction engine 115 utilizes to collect attributes shown in column 310. FIG. 3 shows a collection of domain discernible attributes (330), from template "X," which includes header attributes, footer attributes, a symbol attribute, color attributes, a citation attribute, a formulaic layout attribute, and location-specified fonts attribute.

Some of these attributes may be common among different domains (e.g., font type), while other attributes may be unique to a documents belonging to a specific domain (e.g., company symbol). As such, attribute extraction engine 115 assigns higher correlation values to those attributes that are domain-unique (shown in column 320). In one embodiment, and as shown in FIG. 3, attribute extraction engine 115 automatically assigns higher correlation values to attributes such as a symbol attribute or a citation attribute based on, for example, developer-specified rules. In turn, when a document from corpus set store 140 includes a matching symbol or citation, document correlation engine 130 determines that the document reaches a correlation threshold (e.g., 1.3) and stores the document in the appropriate domain corpus subset (see FIG. 7 and corresponding text for further details).

Figure 4:
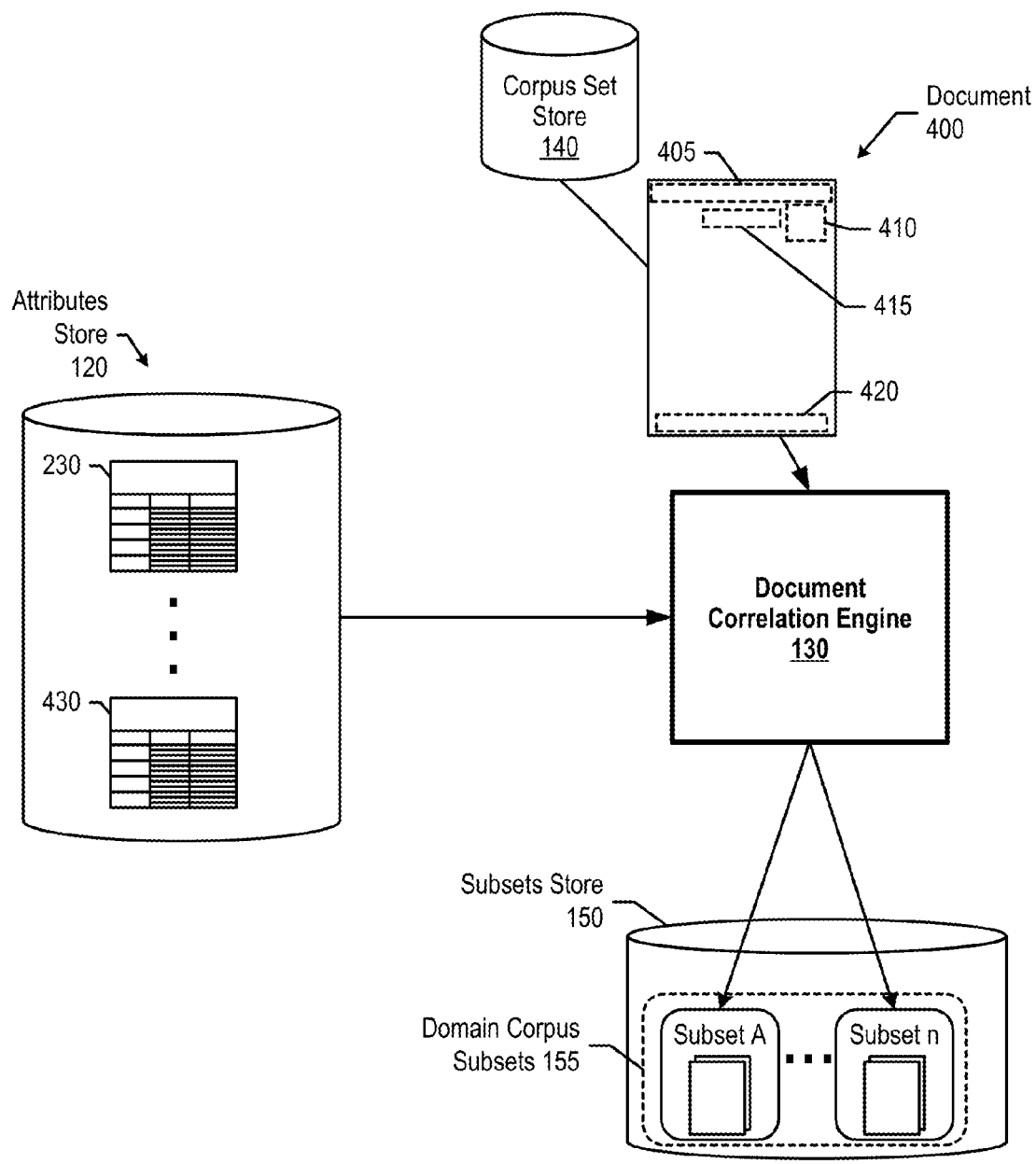
FIG. 4 is an exemplary diagram depicting a document correlation engine that correlates a document to a domain corpus subset by comparing the document's attributes to domain discernible attributes.

FIG. 4 is an exemplary diagram depicting a document correlation engine that correlates a document to a domain corpus subset by comparing the document's attributes to domain discernible attributes. Document correlation engine 130 retrieves document 400 (included in documents 135) from corpus set store 140. Document 400 includes document attributes 405, 410, 415, and 420 that correspond to document 400's header, symbol, title, and footer, respectively. Document correlation engine 130 correlates document attributes 405-420 to domain discernible attributes in attributes store 120 to determine which of domain corpus subsets 150 to store document 400.

In one embodiment, attributes store 120 includes a domain attribute table for each domain, such as tables 230 and 430. In this embodiment, document correlation engine 130 identifies a document attribute (e.g., attribute 410) and determines whether the attribute correlates to any of the domain discernible attributes in any of the tables. If the correlation results reach a threshold, document correlation engine 130 stores document 400 in the corresponding one of document corpus subsets 155 in subsets store 150.

Figure 5:
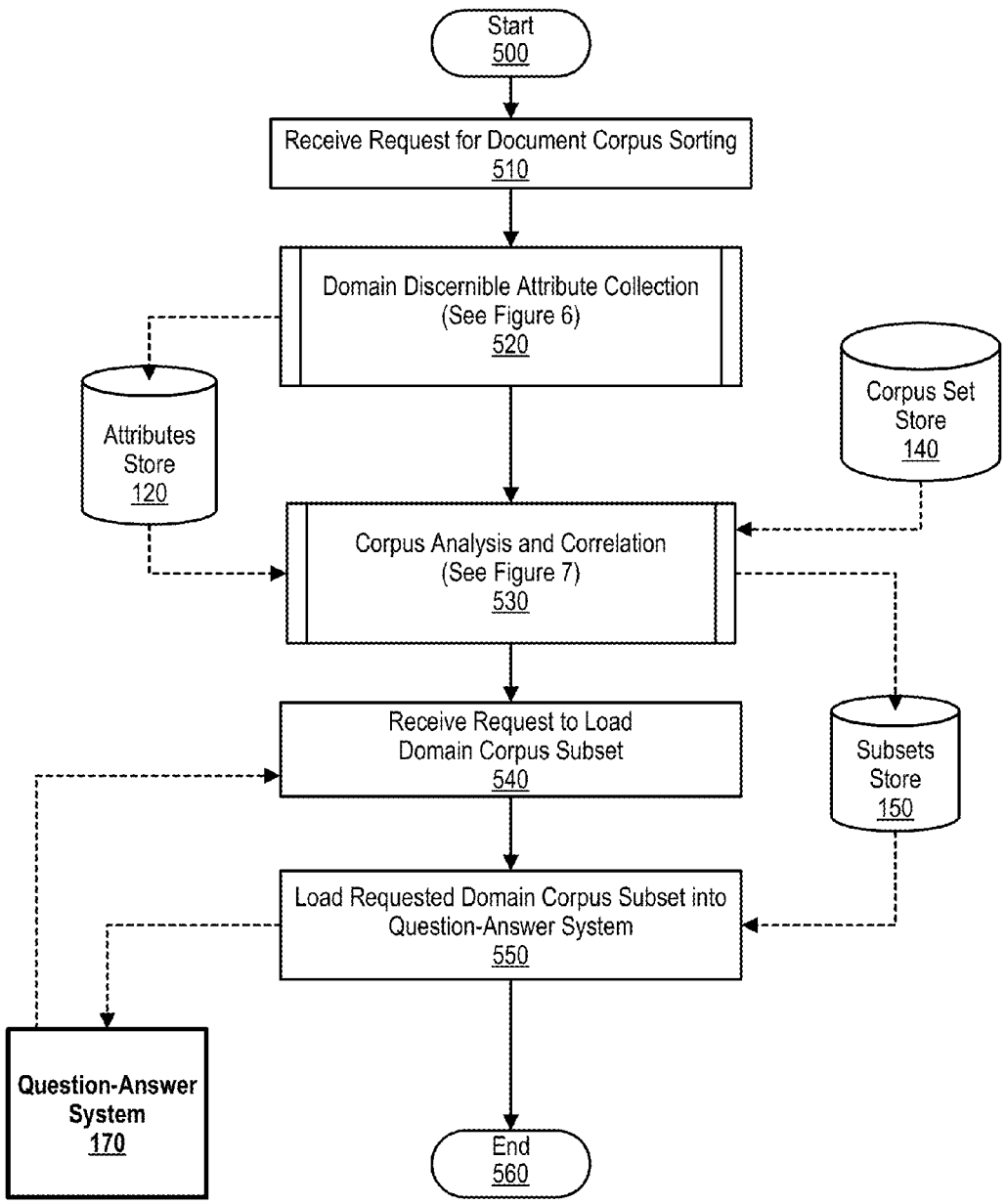
FIG. 5 is an exemplary flowchart depicting steps to sort documents from a document corpus into domain corpus subsets and provide specific document corpus subsets as requested by a question-answer system to improve the question-answer system's response accuracy.

FIG. 5 is an exemplary flowchart depicting steps to sort documents from a document corpus into domain corpus subsets and provide specific document corpus subsets as requested by a question-answer system to improve the question-answer system's response accuracy.

Processing commences at 500, whereupon the domain corpus subset generator receives a request to sort a document corpus (510). In one embodiment, question-answer system 170 may send a request to domain corpus subset generator 100 on a recurring basis (e.g., every week) to ensure that the domain corpus subsets are current. In another embodiment, question-answer system 170 may send a request to domain corpus subset generator 100 to generate a specific domain corpus subset based upon a specific input question.

Figure 6:
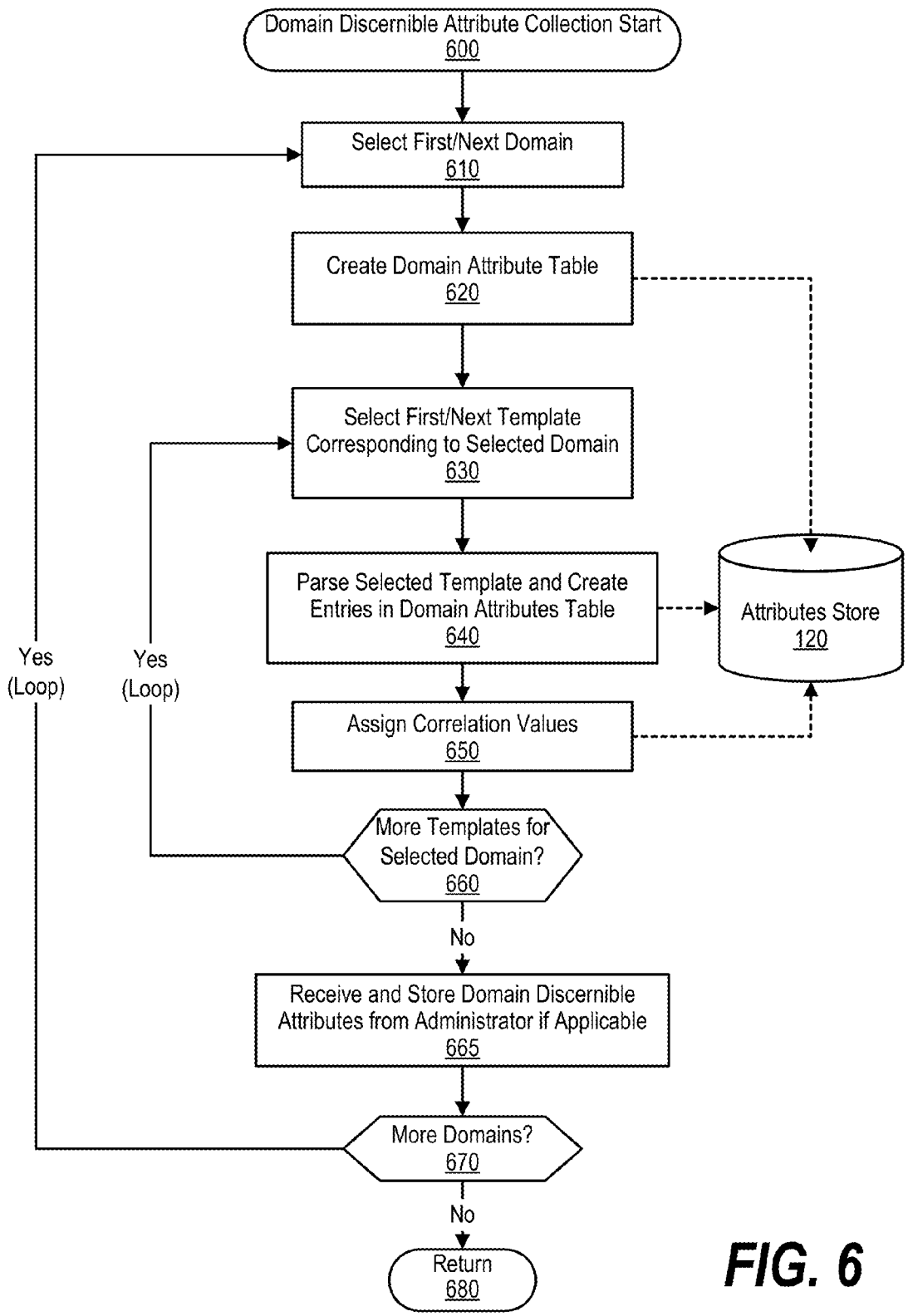
FIG. 6 is an exemplary flowchart depicting steps to extract domain discernible attributes from domain-associated templates and store the extracted attributes in a corresponding domain attribute table.

The domain corpus subset generator begins corpus sorting by collecting domain discernible attributes and storing the domain discernible attributes in attributes store 120, such as from domain-associated templates or from a system administrator that provides customized domain discernible attributes (pre-defined process block 520, see FIG. 6 and corresponding text for further details).

Figure 7:
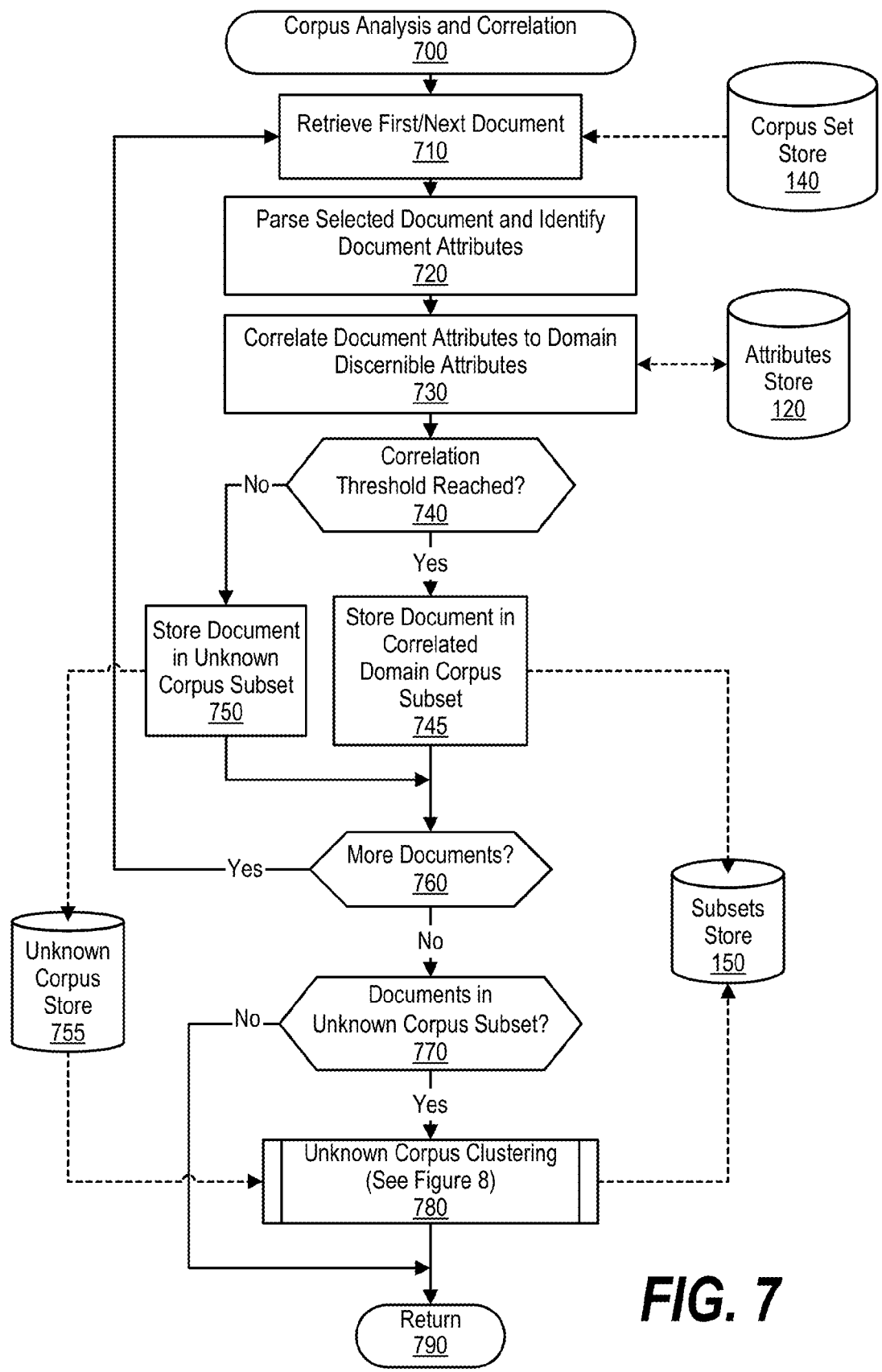
FIG. 7 is an exemplary flowchart depicting steps to sort a document corpus into domain corpus subsets based upon correlating document attributes to domain discernible attributes.

The domain corpus subset generator then extracts document attributes from each document included in corpus set store 140 and compares the document attributes to the document discernible attributes in attributes store 120 (pre-defined process block 530, see FIG. 7 and corresponding text for further details). When the domain corpus subset generator determines that a document correlates to a particular domain, the domain corpus subset generator stores the document in the domain's corpus subset in subset store 150.

In one embodiment, the domain corpus subset may identify documents that do not correlate to a particular domain corpus subset. In this embodiment, the domain corpus subset may create document clusters based upon similar attributes and analyze the document clusters against the domain discernible attributes (see FIGS. 7, 8, and corresponding text for further details).

At 540, the domain corpus subset generator receives a request from question-answer system 170 to load a specific domain corpus subset (step 540). In turn, the domain corpus subset generator retrieves the specific domain corpus subset (documents) from domain corpus subsets store 150 and loads the domain corpus subset into question-answer system 170 at 550. Processing ends at 560.

FIG. 6 is an exemplary flowchart depicting steps to extract domain discernible attributes from domain-associated templates and store the extracted attributes in a corresponding domain attribute table.

Processing commences at 600, whereupon a domain corpus subset generator selects a first domain at step 610, such as a "Legal" domain. At 620, the domain corpus subset generator creates a domain attribute table in attributes store 120, such as that shown in FIG. 3. As those skilled in the art can appreciate, the domain corpus subset generator may create a different data organization mechanism besides a table, such as a data structure, database, or graph structure.

The domain corpus subset generator selects a first template corresponding to the selected domain at 630. At 640, the domain corpus subset generator parses the selected template to identify template attributes such as header font, symbols, etc., and stores the template attributes in the corresponding template attribute table.

At 650, the domain corpus subset generator assigns a correlation value to the template attribute table entries. In one embodiment, the correlation values indicate a correlation confidence level when a document includes a document attribute that correlates to a particular template attribute. In this embodiment, attribute correlation values correspond to the "uniqueness" of the template attribute, such as a high correlation value for a unique symbol, and a low correlation value for a font size.

The domain corpus subset generator determines whether there are more templates that correspond to the selected domain to analyze (decision 660). If there are more templates to analyze, decision 660 branches to the "Yes" branch whereupon processing loops back to select and process the next template. This looping continues until there are no more templates to analyze that correspond to the selected domain, at which point decision 660 branches to the "No" branch.

At 665, the domain corpus subset generator receives input from an administrator, if applicable, that includes domain discernible attributes to associate with the selected domain. For example, the administrator may provide content attributes for a particular domain, such as keywords that distinguish a document's content (e.g., "spark plugs" for an automotive domain).

The domain corpus subset generator determines whether there are more domains to select and obtain template attributes (decision 670). If there are more domains to select and process, decision 670 branches to the "Yes" branch, which loops back to select and process the next set of domain-associated templates. This looping continues until there are no more domains to select, at which point decision 670 branches to the "No" branch and processing returns at 680.

FIG. 7 is an exemplary flowchart depicting steps to sort a document corpus into domain corpus subsets based upon correlating document attributes to domain discernible attributes. Processing commences at 700, whereupon the domain corpus subset generator retrieves the first document from corpus set store 140. At step 720, the domain corpus subset generator parses the selected document and identifies document attributes such as symbols, citations, header properties, color properties, and etcetera. In turn, the domain corpus subset generator correlates the identified document attributes with domain discernible attributes included in attributes store 120.

In one embodiment, document correlation engine 130 includes a classifier that analyzes the documents and generates a degree of confidence for a domain. In this embodiment, the classifier generates the correlations based on statistical similarity of a set of features and, if the similarity of features exceeds a percentage of similarity, document correlation engine 130 correlates the document to the domain. For example, a document has document attributes of FONT: Times New Roman, FOOTER: date time logo, and WATERMARK: XYZ. In this example, the classifier correlates the font attribute to a "Computer Science" domain, the footer attribute to a "Legal" domain, and the watermark attribute to a "Business" domain and a "Computer Science" domain. In this example, the correlation results in the document having a ⅔ computer science domain correlation, ⅓ Legal domain correlation, and ⅓ business domain correlation and, therefore, document correlation engine 130 assigns the document to the computer science domain.

The domain corpus subset generator determines whether the correlation results reach a correlation threshold of a domain (decision 740). If the correlation results reach the correlation threshold, decision 740 branches to the "Yes" branch, whereupon the domain corpus subset generator stores the document in the domain corpus subset corresponding to the correlated domain (step 745). On the other hand, if the correlation does not reach the threshold, decision 740 branches to the "No" branch whereupon the domain corpus subset generator temporarily stores the document in unknown corpus store 755 at step 750.

The domain corpus subset generator determines whether there are more documents in corpus set store 140 to sort (decision 760). If there are more documents to sort, decision 760 branches to the "Yes" branch, which loops back to retrieve and process the next document. This looping continues until there are no more documents to sort, at which point decision 760 branches to the "No" branch.

The domain corpus subset generator determines whether there are any documents stored in unknown corpus store 755 (decision 770). If unknown corpus store 755 includes stored documents, decision 770 branches to the "Yes" branch, whereupon the domain corpus subset generator identifies similarities between the documents and stores the documents in a domain corpus subset according to their similarities (pre-defined process block 780, see FIG. 8 and corresponding text for further details). On the other hand, if there are no documents stored in unknown corpus store 755, decision 770 branches to the "No" branch, bypassing step 780. Processing returns at 790.

Figure 8:
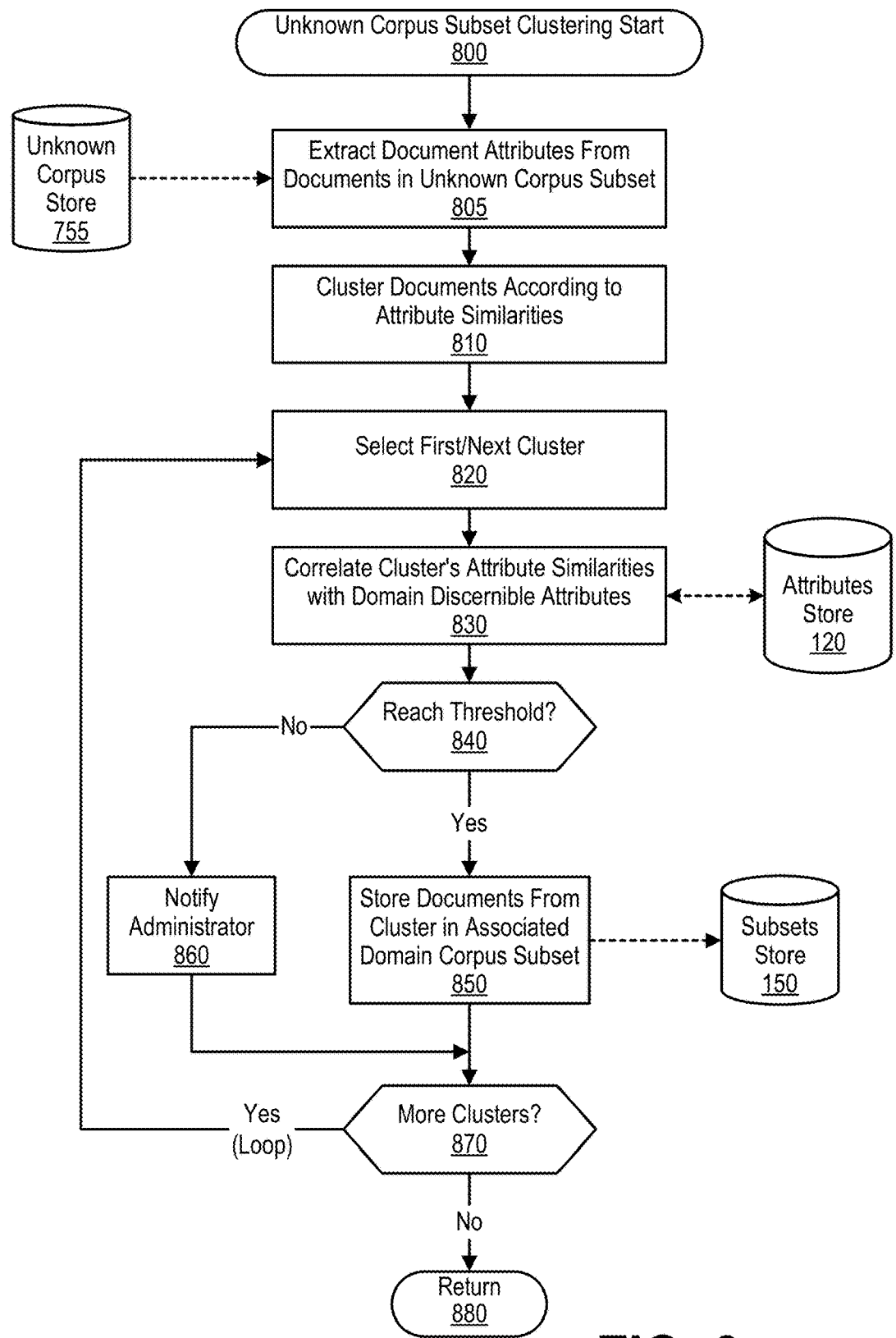
FIG. 8 is an exemplary flowchart showing steps to assign uncorrelated documents to a document corpus subset.

FIG. 8 is an exemplary flowchart showing steps to assign uncorrelated documents to a document corpus subset. Processing commences at 800, whereupon the domain corpus subset generator extracts document attributes from documents included in unknown corpus store 755 (step 805). At step 810, the domain corpus subset generator clusters the documents based upon attribute similarities having similar features, such as a similar footer. In one embodiment, the domain corpus subset generator partitions the documents into similar groups using clustering analysis such as K-Means.

The domain corpus subset generator selects a first cluster at step 820, and correlates the cluster's similar attributes with domain discernible attributes in attributes store 125 (step 830). In one embodiment, the domain corpus subset generator may perform the correlation based on a reduced number of features (e.g., footer and header attributes), or reduce the correlation threshold based on the document cluster's main features.

The domain corpus subset generator determines whether the correlation generates a result that reaches the correlation threshold (decision 840). If the correlation result reaches the threshold, decision 840 branches to the "Yes" branch, whereupon the domain corpus subset generation stores the documents included in the selected cluster into the corresponding domain corpus subset in subset store 150. On the other hand, if the correlation result does not reach the threshold, decision 840 branches to the "No" branch, whereupon the domain corpus subset generator notifies administrator 112 at 860. In one embodiment, administrator 112 may manually assign the uncorrelated cluster of documents to a particular domain.

The domain corpus subset generator determines whether there are more clusters to correlate (decision 870). If there are more clusters to correlate, decision 870 branches to the "Yes" branch, which loops back to process the next cluster of documents. This looping continues until each of the clusters is processed, at which point decision 870 branches to the "No" branch, whereupon processing returns at 880.

Figure 9:
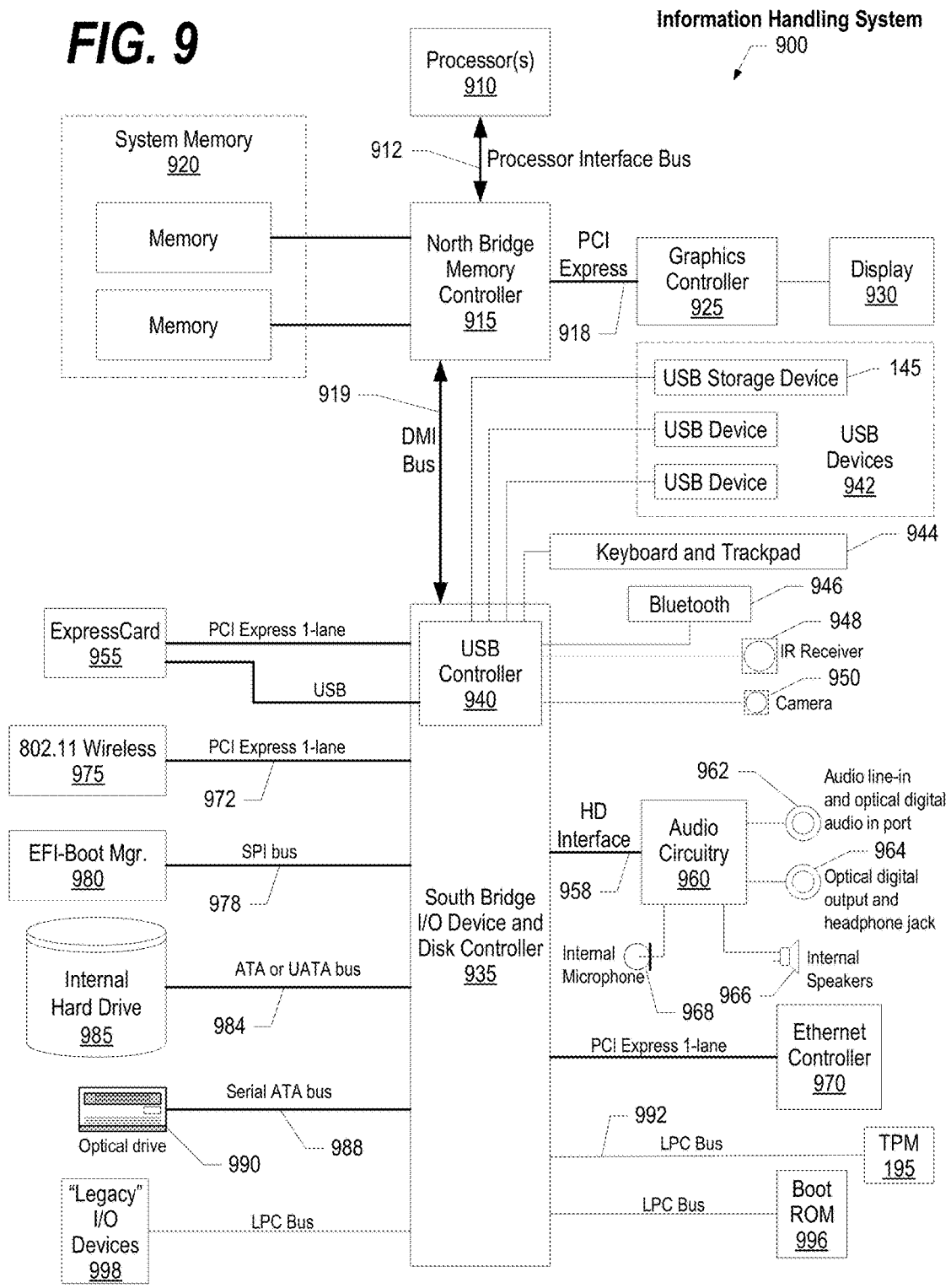
FIG. 9 is a block diagram of a data processing system in which the methods described herein can be implemented.

FIG. 9 illustrates information handling system 900, which is a simplified example of a computer system capable of performing the computing operations described herein. Information handling system 900 includes one or more processors 910 coupled to processor interface bus 912. Processor interface bus 912 connects processors 910 to Northbridge 915, which is also known as the Memory Controller Hub (MCH). Northbridge 915 connects to system memory 920 and provides a means for processor(s) 910 to access the system memory. Graphics controller 925 also connects to Northbridge 915. In one embodiment, PCI Express bus 918 connects Northbridge 915 to graphics controller 925. Graphics controller 925 connects to display device 930, such as a computer monitor.

Northbridge 915 and Southbridge 935 connect to each other using bus 919. In one embodiment, the bus is a Direct Media Interface (DMI) bus that transfers data at high speeds in each direction between Northbridge 915 and Southbridge 935. In another embodiment, a Peripheral Component Interconnect (PCI) bus connects the Northbridge and the Southbridge. Southbridge 935, also known as the I/O Controller Hub (ICH) is a chip that generally implements capabilities that operate at slower speeds than the capabilities provided by the Northbridge. Southbridge 935 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 996 and "legacy" I/O devices (using a "super I/O" chip). The "legacy" I/O devices (998) can include, for example, serial and parallel ports, keyboard, mouse, and/or a floppy disk controller. The LPC bus also connects Southbridge 935 to Trusted Platform Module (TPM) 995. Other components often included in Southbridge 935 include a Direct Memory Access (DMA) controller, a Programmable Interrupt Controller (PIC), and a storage device controller, which connects Southbridge 935 to nonvolatile storage device 985, such as a hard disk drive, using bus 984.

ExpressCard 955 is a slot that connects hot-pluggable devices to the information handling system. ExpressCard 955 supports both PCI Express and USB connectivity as it connects to Southbridge 935 using both the Universal Serial Bus (USB) the PCI Express bus. Southbridge 935 includes USB Controller 940 that provides USB connectivity to devices that connect to the USB. These devices include webcam (camera) 950, infrared (IR) receiver 948, keyboard and trackpad 944, and Bluetooth device 946, which provides for wireless personal area networks (PANs). USB Controller 940 also provides USB connectivity to other miscellaneous USB connected devices 942, such as a mouse, removable nonvolatile storage device 945, modems, network cards, ISDN connectors, fax, printers, USB hubs, and many other types of USB connected devices. While removable nonvolatile storage device 945 is shown as a USB-connected device, removable nonvolatile storage device 945 could be connected using a different interface, such as a Firewire interface, etcetera.

Wireless Local Area Network (LAN) device 975 connects to Southbridge 935 via the PCI or PCI Express bus 972. LAN device 975 typically implements one of the IEEE 802.11 standards of over-the-air modulation techniques that all use the same protocol to wireless communicate between information handling system 900 and another computer system or device. Optical storage device 990 connects to Southbridge 935 using Serial ATA (SATA) bus 988. Serial ATA adapters and devices communicate over a high-speed serial link. The Serial ATA bus also connects Southbridge 935 to other forms of storage devices, such as hard disk drives. Audio circuitry 960, such as a sound card, connects to Southbridge 935 via bus 958. Audio circuitry 960 also provides functionality such as audio line-in and optical digital audio in port 962, optical digital output and headphone jack 964, internal speakers 966, and internal microphone 968. Ethernet controller 970 connects to Southbridge 935 using a bus, such as the PCI or PCI Express bus. Ethernet controller 970 connects information handling system 900 to a computer network, such as a Local Area Network (LAN), the Internet, and other public and private computer networks.

While FIG. 9 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 995) shown in FIG. 9 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 10.

Figure 10:
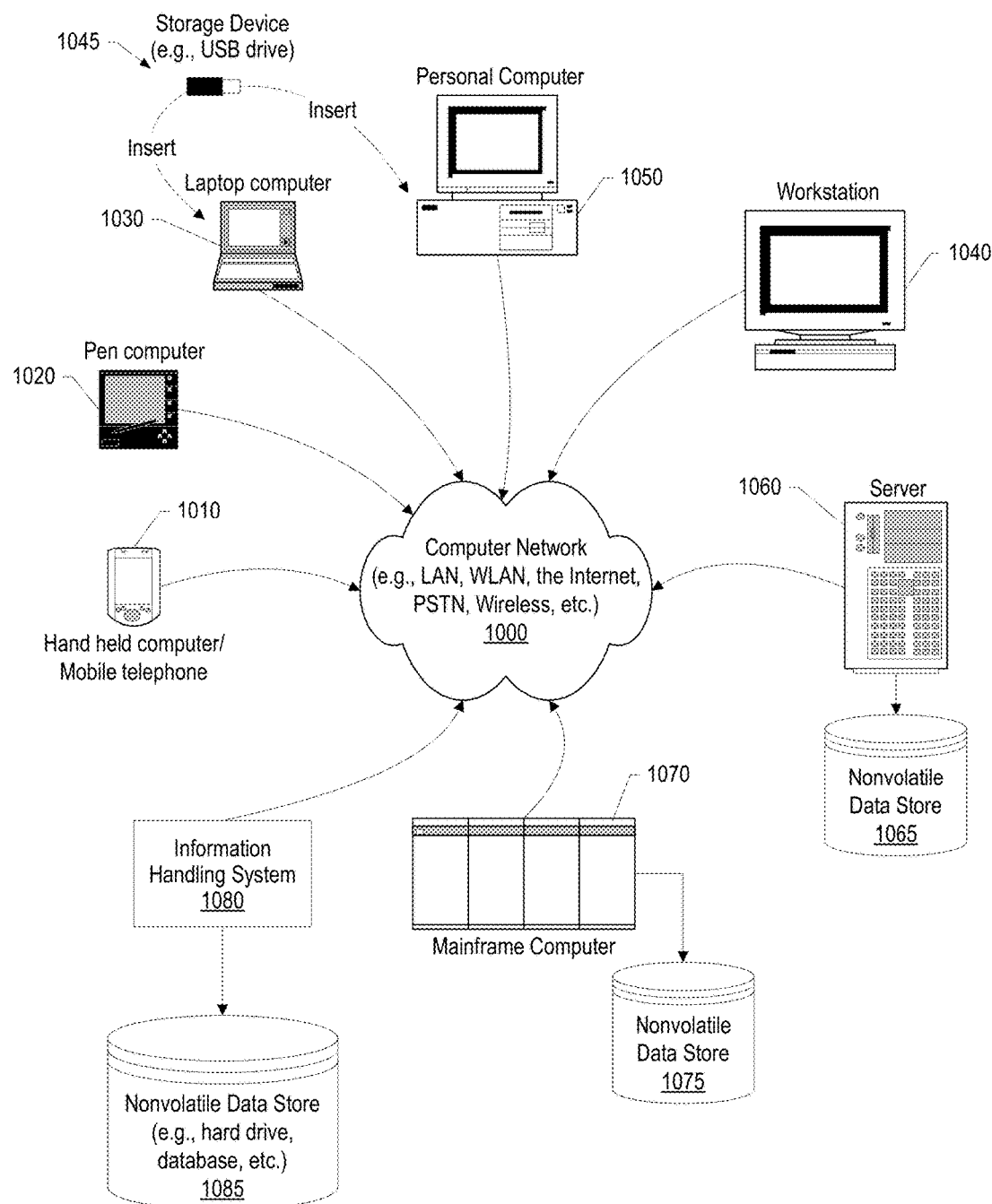
FIG. 10 provides an extension of the information handling system environment shown in FIG. 9 to illustrate that the methods described herein can be performed on a wide variety of information handling systems which operate in a networked environment.

FIG. 10 provides an extension of the information handling system environment shown in FIG. 9 to illustrate that the methods described herein can be performed on a wide variety of information handling systems that operate in a networked environment. Types of information handling systems range from small handheld devices, such as handheld computer/mobile telephone 1010 to large mainframe systems, such as mainframe computer 1070. Examples of handheld computer 1010 include personal digital assistants (PDAs), personal entertainment devices, such as MP3 players, portable televisions, and compact disc players. Other examples of information handling systems include pen, or tablet, computer 1020, laptop, or notebook, computer 1030, workstation 1040, personal computer system 1050, and server 1060. Other types of information handling systems that are not individually shown in FIG. 10 are represented by information handling system 1080. As shown, the various information handling systems can be networked together using computer network 1000. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 10 depicts separate nonvolatile data stores (server 1060 utilizes nonvolatile data store 1065, mainframe computer 1070 utilizes nonvolatile data store 1075, and information handling system 1080 utilizes nonvolatile data store 1085). The nonvolatile data store can be a component that is external to the various information handling systems or can be internal to one of the information handling systems. In addition, removable nonvolatile storage device 945 can be shared among two or more information handling systems using various techniques, such as connecting the removable nonvolatile storage device 945 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
 evaluating a first document and a plurality of second documents against a plurality of sets of domain discernible attributes corresponding to a plurality of domain corpus subsets;
 generating, in response to the evaluating, a first correlation value corresponding to the first document and a plurality of second correlation values corresponding to the plurality of second documents;
 in response to evaluating the first document and the plurality of second documents against the plurality of sets of domain discernible attributes:
  determining that the first correlation value reaches a correlation threshold corresponding to a first one of the plurality of sets of domain discernible attributes corresponding to a first one of the plurality of domain corpus subsets;
  including the first document in the first domain corpus subset in response to the first correlation value reaching the correlation threshold;
  determining that each of the plurality of second correlation values, evaluated individually, do not reach the correlation threshold corresponding to any of the plurality of sets of domain discernible attributes; and
  combining the plurality of second documents into a cluster of documents in response to determining that each of the plurality of second documents comprise at least one similar document attribute and that each of the plurality of second correlation values individually do not reach the correlation threshold corresponding to any of the plurality of sets of domain discernible attributes;

generating a third correlation value in response to analyzing the cluster of documents against the plurality of sets of domain discernible attributes;

determining, based on the analyzing, that the third correlation value reaches the correlation threshold corresponding to a second one of the plurality of sets of domain discernible attributes corresponding to a second one of the plurality of domain corpus subsets;

including the plurality of second documents in the second domain corpus subset in response to determining that the third correlation value reaches the correlation threshold corresponding to the second set of domain discernible attributes; and utilizing at least one of the plurality of domain corpus subsets in a question-answer system to process an input question.

2. The method of claim 1 wherein, prior to the correlating of the first document, the method further comprises:

retrieving a template that corresponds to the first domain corpus subset;

identifying one or more template attributes included in the identified template; and assigning the one or more template attributes to the first domain corpus subset, wherein the assigning results in the first set of domain discernible attributes.

3. The method of claim 1 further comprising:

parsing the first document into a plurality of first document attributes; and matching one or more of the plurality of first document attributes to one or more domain discernible attributes included in the first set of domain discernible attributes.

4. The method of claim 3 further comprising:

computing the first correlation value based upon one or more attribute correlation values corresponding to the matched domain discernible attributes.

5. The method of claim 3 wherein the plurality of first document attributes include at least one style attribute selected from the group consisting of a symbol attribute, a citation attribute, a title attribute, a header attribute, and a footer attribute.

6. The method of claim 1 further comprising:

matching the input question to a selected domain included in a plurality of domains;

determining that the first domain corpus subset corresponds to the selected domain; and providing the first domain corpus subset to the question-answer system in response to the determination that the first domain corpus subset corresponds to the selected domain.

7. The method of claim 1 further comprising:

generating a fourth correlation value corresponding to the first document based on evaluating the first document against a third one of the plurality of sets of domain discernible attributes;

determining that the fourth correlation value reaches the correlation threshold corresponding to a third one of the plurality of sets of domain discernible attributes; and including the first document in both the first domain corpus subset and a third domain corpus subset that corresponds to the third set of domain discernible attributes.

* * * * *